(12) United States Patent
Meier et al.

(10) Patent No.: US 11,410,391 B2
(45) Date of Patent: *Aug. 9, 2022

(54) METHOD FOR REPRESENTING VIRTUAL INFORMATION IN A VIEW OF A REAL ENVIRONMENT

(71) Applicant: Apple Inc., Cupertino, CA (US)

(72) Inventors: Peter Meier, Los Gatos, CA (US);
Michael Kuhn, Los Gatos, CA (US);
Frank Angermann, Munich (DE)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/658,851

(22) Filed: Oct. 21, 2019

(65) Prior Publication Data

US 2020/0160605 A1 May 21, 2020

Related U.S. Application Data

(63) Continuation of application No. 16/126,785, filed on Sep. 10, 2018, now Pat. No. 10,453,267, which is a
(Continued)

(30) Foreign Application Priority Data

Oct. 12, 2009 (DE) .......................... 10 2009 049 073.6

(51) Int. Cl.
*G06T 19/00* (2011.01)
(52) U.S. Cl.
CPC ............ *G06T 19/006* (2013.01); *G06T 19/00* (2013.01); *G06T 2219/024* (2013.01)
(58) Field of Classification Search
None
See application file for complete search history.

(56) References Cited

U.S. PATENT DOCUMENTS

| 6,604,049 | B2 * | 8/2003 | Yokota ................. G01C 21/20 340/988 |
| 7,023,536 | B2 | 4/2006 | Zhang |
| 7,038,846 | B2 | 5/2006 | Mandella |
| 7,088,440 | B2 | 8/2006 | Buermann |

(Continued)

FOREIGN PATENT DOCUMENTS

| CN | 101035250 A | 9/2007 |
| CN | 101067716 A | 11/2007 |

(Continued)

OTHER PUBLICATIONS

Azuma, et al., "Recent Advances in Augmented Reality," 2001, IEEE, DOI: 10.1109/38.963459.
Enkin Research Team: "Enkin," youtube video, Apr. 11, 2008, http://www.youtube.com/watch?v=2V6MNp_tWG0.
(Continued)

*Primary Examiner* — Michael J Cobb
(74) *Attorney, Agent, or Firm* — Blank Rome LLP

(57) ABSTRACT

A method for representing virtual information in a view of a real environment comprises providing a virtual object having a global position and orientation with respect to a geographic global coordinate system, with first pose data on the global position and orientation of the virtual object, in a database of a server, taking an image of a real environment by a mobile device and providing second pose data as to at which position and with which orientation with respect to the geographic global coordinate system the image was taken. The method further includes displaying the image on a display of the mobile device, accessing the virtual object in the database and positioning the virtual object in the image on the basis of the first and second pose data, manipulating the virtual object or adding a further virtual object, and providing the manipulated virtual object with
(Continued)

modified first pose data or the further virtual object with third pose data in the database.

13 Claims, 8 Drawing Sheets

Related U.S. Application Data continuation of application No. 14/616,213, filed on Feb. 6, 2015, now Pat. No. 10,074,215, which is a continuation of application No. 13/501,697, filed as application No. PCT/EP2010/065207 on Oct. 11, 2010, now Pat. No. 9,001,154.

(56) References Cited

U.S. PATENT DOCUMENTS

| | | | |
|---|---|---|---|
| 7,110,100 B2 | 9/2006 | Buermann | |
| 7,113,270 B2 | 9/2006 | Buermann | |
| 7,161,664 B2 | 1/2007 | Buermann | |
| 7,203,384 B2 | 4/2007 | Carl | |
| 7,268,956 B2 | 9/2007 | Mandella | |
| 7,474,809 B2 | 1/2009 | Carl | |
| 7,729,515 B2 | 6/2010 | Mandella | |
| 7,826,641 B2 | 11/2010 | Mandella | |
| 7,961,909 B2 | 6/2011 | Mandella | |
| 9,001,154 B2 | 4/2015 | Meier | |
| 9,685,004 B2 | 6/2017 | Wang | |
| 10,074,215 B2 | 9/2018 | Meier | |
| 11,263,456 B2 * | 3/2022 | Ishihara | G06V 40/103 |
| 2002/0120728 A1 | 8/2002 | Braatz | |
| 2002/0149581 A1 | 10/2002 | Furlong | |
| 2004/0246229 A1 | 12/2004 | Yamada | |
| 2005/0018879 A1 | 1/2005 | Ito | |
| 2005/0152604 A1 | 7/2005 | Kitagawa | |
| 2005/0168437 A1 | 8/2005 | Carl | |
| 2006/0025681 A1 * | 2/2006 | Abovitz | A61B 6/583 |
| | | | 600/425 |
| 2006/0027658 A1 | 2/2006 | Genc | |
| 2007/0018975 A1 | 1/2007 | Chuanggui | |
| 2007/0055977 A1 | 3/2007 | Becker | |
| 2007/0146391 A1 | 6/2007 | Pentenrieder | |
| 2007/0248258 A1 | 10/2007 | Mitsui | |
| 2008/0024484 A1 | 1/2008 | Naimark | |
| 2008/0094417 A1 | 4/2008 | Cohen | |
| 2008/0167814 A1 | 7/2008 | Samarasekera | |
| 2009/0007188 A1 | 1/2009 | Omernick | |
| 2009/0073190 A1 | 3/2009 | Jung | |
| 2009/0167760 A1 | 7/2009 | Wang | |
| 2009/0179895 A1 | 7/2009 | Zhu | |
| 2009/0231248 A1 | 9/2009 | Dorff | |
| 2010/0316281 A1 * | 12/2010 | Lefevre | G06T 7/75 |
| | | | 382/154 |
| 2011/0080421 A1 | 4/2011 | Capener | |
| 2011/0227915 A1 | 9/2011 | Mandella | |
| 2012/0038549 A1 | 2/2012 | Mandella | |
| 2012/0314017 A1 | 12/2012 | Gross | |
| 2013/0194418 A1 | 8/2013 | Gonzalez-Banos | |
| 2014/0022281 A1 | 1/2014 | Georgeson | |
| 2014/0321705 A1 * | 10/2014 | BenHimane | G06T 7/246 |
| | | | 382/103 |
| 2015/0221133 A1 * | 8/2015 | Groten | G06F 3/0346 |
| | | | 345/633 |
| 2015/0235424 A1 | 8/2015 | Wang | |

FOREIGN PATENT DOCUMENTS

| | | |
|---|---|---|
| CN | 101127621 A | 2/2008 |
| CN | 101335712 A | 12/2008 |
| CN | 101507268 A | 8/2009 |
| JP | 2005174021 A | 6/2005 |
| WO | 2008143523 A1 | 11/2008 |

OTHER PUBLICATIONS

Feiner, et al., "A Touring Machine: Prototyping 3d Mobile Augmented Reality Systems for Exploring the Urban Environment," Proceedings of the 1st International Symposium on Wearable computers, pp. 74-81, 1997.

Guan, et al., Real-Time Camera Pose Estimation for Wide-Area Augmented Reality Applications, 2011, IEEE Computer Graphics and Applications, 31 (3): 56-68.

Guo, et al., "Application of Augmented Reality GIS in Architecture," The International Archives of the Photogrammetry, Remote Sensing and Spatial Information Sciences, vol. XXXVII, Part B5, 2008.

Hoang, et al., "Precise Manipulation at a Distance in Wearable Outdoor Augmented Reality," https://www.icg.tugraz.at/{reitmayr/lgo/>, Oct. 11, 2009.

Kar Wee Chia et al., "Online 6 DOF Augmented Reality Registration from Natural Features", IEEE Computer Society; Los Alamitos, CA; Sep. 30, 2002.

Kiriakos N. Kutulakos, James Vallino, "Affine Object Representations for Calibration-Free Augmented Reality," 1996, Proceedings of the 1996 Virtual Reality Annual International Symposium (VRAIS '96), pp. 25-36.

LaMarca et al., "Place Lab: Device Positioning Using Radio Beacons in the Wild," 2005, International Conference on Pervasive Computing Pervasive 2005, pp. 116-133.

Lourakis, et al., "SBA: A Software Package for Generic Sparse Bundle Adjustment," ACM Transactions on Mathematical Software, vol. 36, No. 1, Mar. 2009.

M. Brown and D. G. Lowe, "Unsupervised 3D Object Recognition and Reconstruction in Unordered Datasets," 2005, Proceedings of the Fifth International Conference on 3-D Digital Imaging and Modeling (3DIM'05), pp. 56-63, DOI: 10-1109/3DIM.2005.81.

NIMA Technical Report TR8350.2, "Department of Defense World Geodetic System 1984, Its Definition and Relationships with Local Geodetic Systems," Third Edition, Amendment 1, Jan. 3, 2000.

Reitmayr, et al., "Going Out: Robust Model-Based Tracking for Outdoor Augmented Reality," Mixed and Augmented Reality, Oct. 1, 2006.

Shunsuke Harasaki, Hideo Saito, "Virtual Object Overlay onto Uncalibrated Camera Images for Augmented Reality," 2003, Systems and Computers in Japan, 34(5):47-55.

Shunsuke Harasaki, Hideo Saito, "Vision-based Overlay of a Virtual Object into Real Scene for Designing Room Interior," 2001, Proc. SPIE 4572, Intelligent Robots and Computer Vision XX: Algorithms, Techniques, and Active Vision, pp. 545-555.

Snavely, et al., "Modeling the World from Internet Photo Collections," 2007, International Jourrnal of Computer Vision, 80(2): 189-210, DOI: 10.1007/s11263-007-0107-3.

State, et al., "Superior Augmented Reality Registration by Integrating Landmark Tracking and Magnetic Tracking," 1996, Proceedings of the 23rd annual conference on Computer graphics and interactive techniques SIGGRAPH '96, pp. 429-438.

Thomas King, Thomas Haenselmann, Wolfgang Effelsberg, "Deployment, Calibration, and Measurement Factors for Position Errors in 802.11-Based Indoor Positioning Systems," 2007, International Symposium on Location-and Context-Awareness LoCA2007, pp. 17-34.

Vacchetti, et al., "Stable Real-Time 3D Tracking Using Online and Offline Information," 2004, IEEE Transactions on Pattern Analysis and Machine Intelligence, 26(10): 1385-1391.

Zhou, et al., "Robust Pose Estimation for Outdoor Mixed Reality with Sensor Fusion," Universal Access in Human-Computer Interaction, Applications and Services, pp. 281-289, Jul. 19, 2009.

* cited by examiner

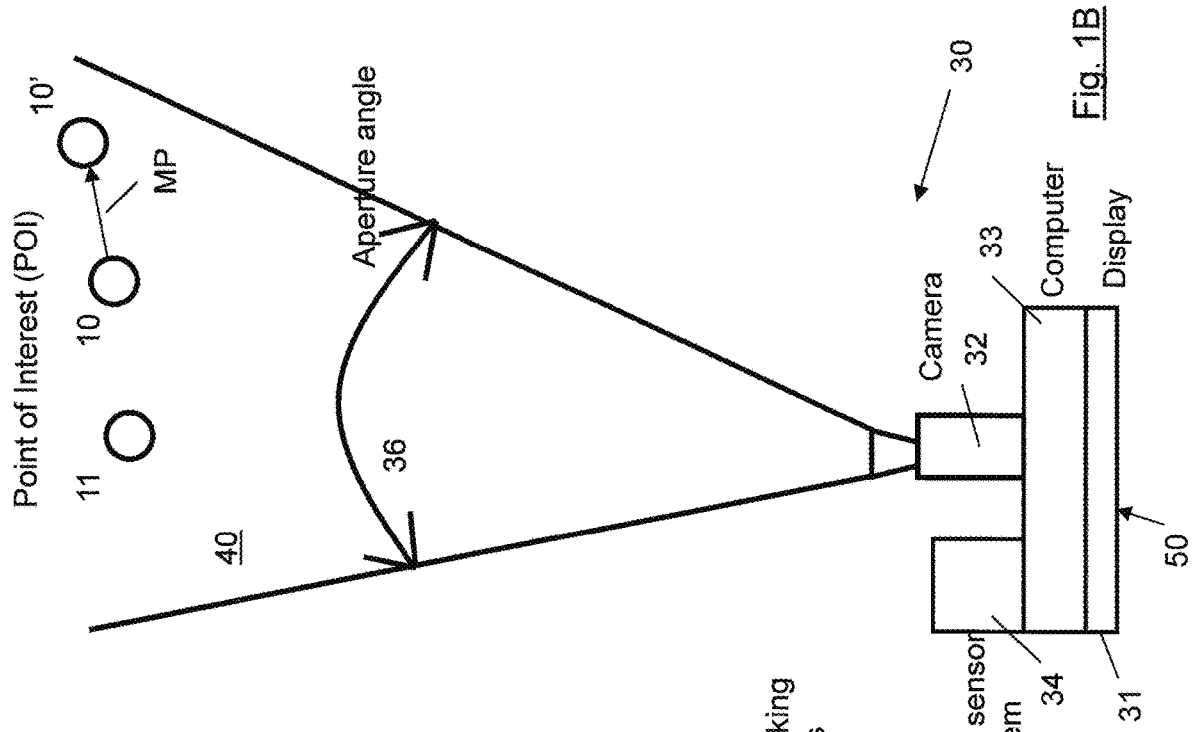
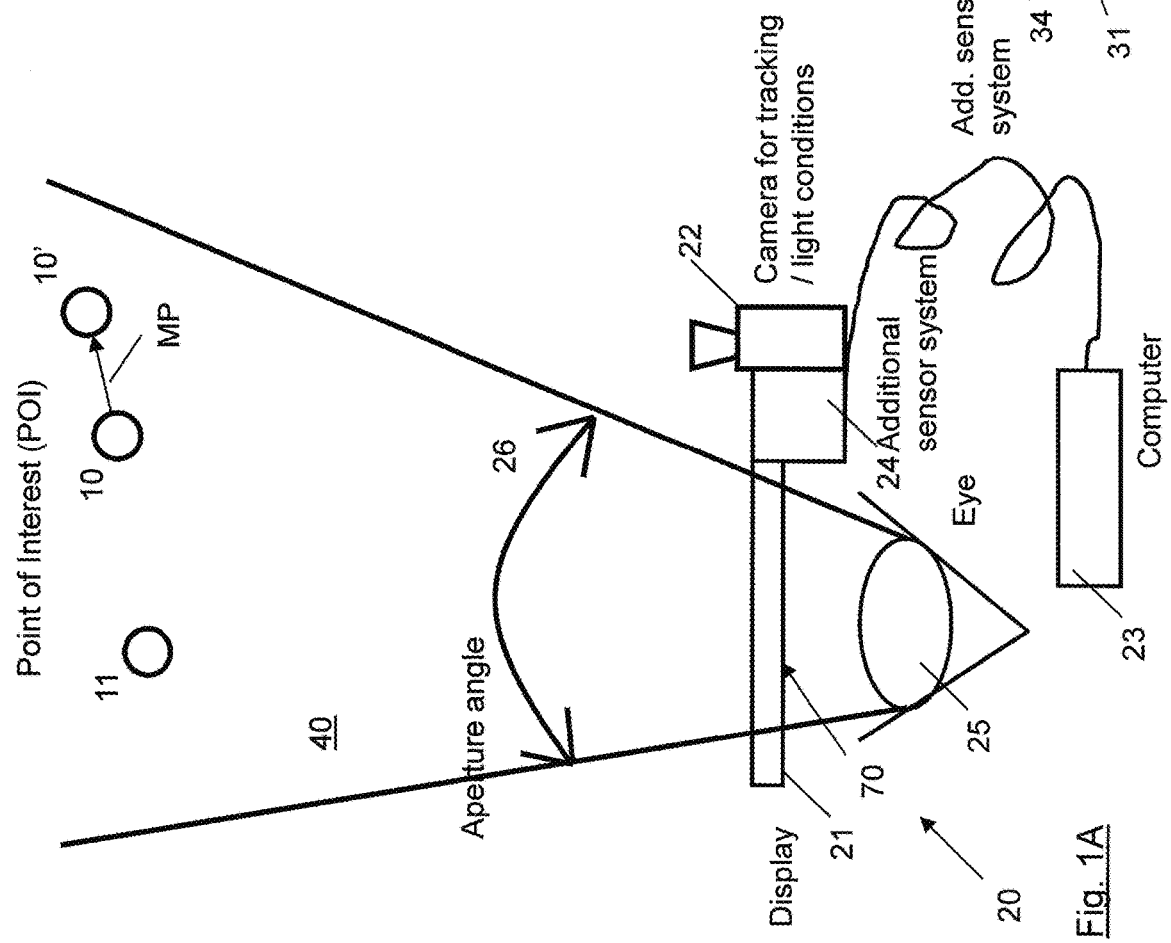

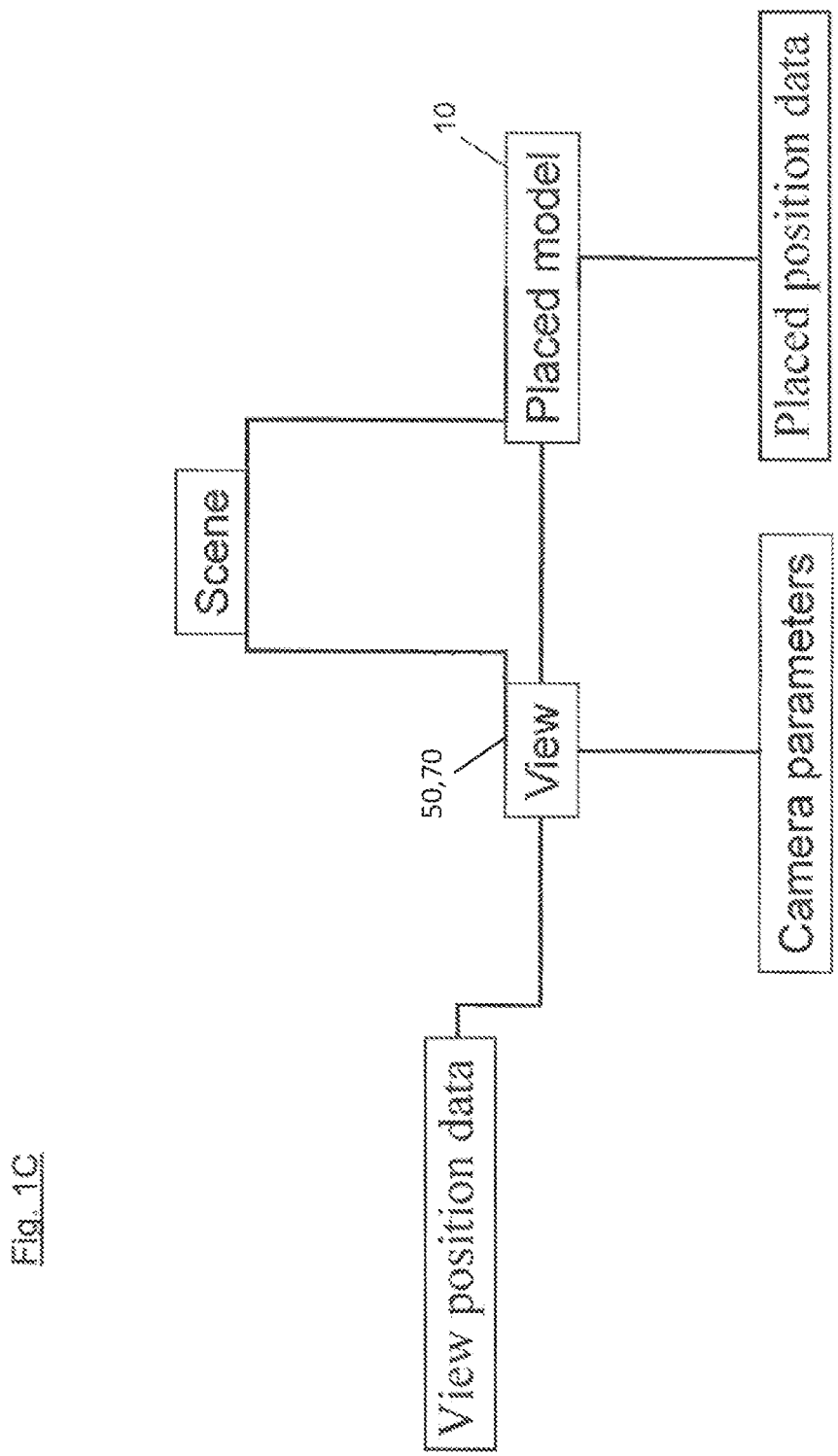

METHOD FOR REPRESENTING VIRTUAL INFORMATION IN A VIEW OF A REAL ENVIRONMENT

CROSS-REFERENCE TO RELATED APPLICATIONS

This application is a continuation of U.S. patent application Ser. No. 16/126,785 filed Sep. 10, 2018, which is a continuation of U.S. patent application Ser. No. 14/616,213 filed Feb. 6, 2015, which is a continuation of U.S. patent application Ser. No. 13/501,697 filed May 4, 2012, which is a national stage application of PCT Application No. PCT Application No. PCT/EP2010/065207 filed on Oct. 11, 2010, which claims priority to German Application No. 10 2009 049 073.6 filed Oct. 12, 2009.

BACKGROUND

1. Technical Field

The present invention relates to a method for representing virtual information in a view of a real environment.

2. Background Information

Augmented Reality (AR) is a technology in which virtual data are overlaid with reality and which thus facilitates the association of data with reality. The use of mobile AR systems is already known in the prior art. In the past years, high-performance mobile devices (e.g. smartphones) turned out to be suitable for AR application. These devices meanwhile have comparatively large color displays, installed cameras, good processors and additional sensors, such as e.g. orientation sensors and GPS. In addition thereto, the position of the device can be approximated via radio networks.

In the past, there were various projects implemented on mobile devices using AR. At first, there were used special optical marks for ascertaining the position and orientation of the device. As regards AR, which is usable for large areas as well and thus is also referred to as large area AR, there have also been published hints for sensible representation of objects in connection with HMDs (Head Mounted Displays) (S. Feiner, B. MacIntyre, T. Hollerer, and A. Webster. A touring machine: Prototyping 3d mobile augmented reality systems for exploring the urban environment. In Proceedings of the 1st International Symposium on Wearable Computers, pages 74-81, 1997). In more recent times, there are also approaches to utilize GPS and the orientation sensor systems of modern devices.

However, the approaches published so far have the disadvantage that they do not permit a simple integration of other users in the AR scenes. In addition thereto, most systems based on GPS and compass have the disadvantage that these devices cogently have to be provided and that there may be great inaccuracies occurring.

US 2009/0179895 A1 describes a method of blending in three-dimensional notes or annotations in an image of a real environment ("street view"). A user, by way of a selection box in the image, selects the location at which an annotation is to be blended in. Thereafter, the selection box is projected on a three-dimensional model in order to determine a position of the annotation in relation to the image. Furthermore, location data corresponding to the projection on the three-dimensional model are determined and associated with the annotation entered by the user. The annotation is stored together with the location data in a database of a server and can be blended in another image of the real environment in accordance with the location data.

The term "tagging" in general and in the following is used to describe enriching of the reality with additional information by a user. Approaches realized so far in connection with tagging include the placing of objects in map views (e.g. Google Maps), taking photographs of location points and storing these images together with additional commentaries as well as creating text messages at specific location points. There is the disadvantage that remote viewers and users can no longer obtain AR access to interactive scenes in the world. Only so-called screenshots (screen images) of the AR scene can be viewed, but no longer be altered.

It is the object of the present invention to indicate a method for representing virtual information in a view of a real environment, which permits users to interactively view AR image scenes created by other users by means of augmented reality and to guarantee high accuracy and user friendliness in doing so.

SUMMARY

According to a first aspect of the invention, there is provided a method for representing virtual information in a view of a real environment, comprising the following steps: providing at least one virtual object having a global position and orientation with respect to a geographic global coordinate system, together with first pose data permitting a conclusion to be made on the global position and orientation of the virtual object, in a database of a server, taking at least one image of a real environment by means of a mobile device and providing second pose data permitting a conclusion to be made as to at which position and with which orientation with respect to the geographic global coordinate system the image was taken, displaying the image on a display of the mobile device, accessing the virtual object in the database of the server and positioning the virtual object in the image shown on the display on the basis of the first and second pose data, manipulating the virtual object or adding a further virtual object by corresponding positioning in the image shown on the display, and providing the manipulated virtual object together with modified first pose data in accordance with the positioning in the image or the further virtual object together with third pose data in accordance with the positioning in the image in the database of the server, the modified first pose data and third pose data each permitting a conclusion to be made on the global position and orientation of the manipulated virtual object or the further manipulated object. In this regard, the image can be provided on the server e.g. together with the second pose data.

According to a further object of the invention, there is provided a method for representing virtual information in a view of a real environment, comprising the following steps: providing at least one virtual object having a global position and orientation with respect to a geographic global coordinate system, together with first pose data permitting a conclusion to be made on the global position and orientation of the virtual object, in a database of a server, providing at least one view of a real environment by means of data glasses (e.g. a so-called optical see-through data glasses or video see-through data glasses) together with second pose data permitting a conclusion to be made as to at which position and with which orientation with respect to the geographic global coordinate system the data glasses are positioned, accessing the virtual object in the database of the server and positioning the virtual object in the view on the basis of the first and second pose data, manipulating the virtual object or adding a further virtual object by corresponding positioning in the view, and providing the manipulated virtual object together with modified first pose data in accordance with the positioning in the view or of the further virtual object together with third pose data in accordance with the positioning in the view in the database of the server, the modified first pose data and third pose data each permitting a conclusion to be made on the global position and orientation of the manipulated virtual object or the further virtual object.

In an embodiment of the invention, the mobile device or the data glasses comprise, or are connected to, a means for generating the second pose data.

For example, the pose data may include respective three-dimensional values concerning position and orientation. Moreover, an orientation of the image of the real environment can be defined independently of the earth's surface.

In accordance with another embodiment of the invention, a storing location on the server stores in which image of several images of a real environment or in which view of several views of a real environment, which virtual object of several virtual objects has been provided with pose data.

When the position of the mobile device is determined e.g. by means of a GPS sensor (GPS: Global Positioning System), it may happen due to sensor inaccuracy or GPS-immanent inaccuracy that the position of the mobile device is determined in relatively inaccurate manner only. This may have the consequence that blended in virtual objects are positioned in the image relative to the geographic global coordinate system with a corresponding inaccuracy as well, so that in other images or views with different viewing angles, the virtual objects blended in there are shown in correspondingly displaced manner with respect to reality.

For enhanced accuracy of the representation of virtual objects or the position of the same in the image of the real environment, an embodiment of the method according to the invention comprises the following steps: providing a reference database with reference views of a real environment together with pose data permitting a conclusion to be made as to at which position and with which orientation with respect to the geographic global coordinate system the respective reference view was taken by a camera, comparing at least one real object that is shown in the image with at least part of a real object that is contained in at least one of the reference views, and matching of the second pose data of the image with the pose data of the at least one reference view, and modifying at least part of the second pose data on the basis of at least part of the pose data of the at least one reference view as a result of said matching.

Another embodiment, furthermore, comprises modifying at least part of the first pose data of the virtual object positioned in the image as a result of matching of the second pose data of the image with the pose data of said at least one reference view.

Further developments and embodiments of the invention can be taken from the dependent claims.

Aspects and embodiments of the invention will be explained in more detail hereinafter by way of the figures shown in the drawings.

BRIEF DESCRIPTION OF THE DRAWINGS

FIG. 1A shows a plan view of a schematic arrangement of a first exemplary embodiment of a system setup that can be used for performing a method according to the invention, FIG. 1B shows a plan view of a schematic arrangement of a second exemplary embodiment of a system setup that can be used for performing a method according to the invention, FIG. 1C shows a schematic view of a possible data structure of an embodiment of a system for performing a method according to the invention.

DETAILED DESCRIPTION

Figure 2:
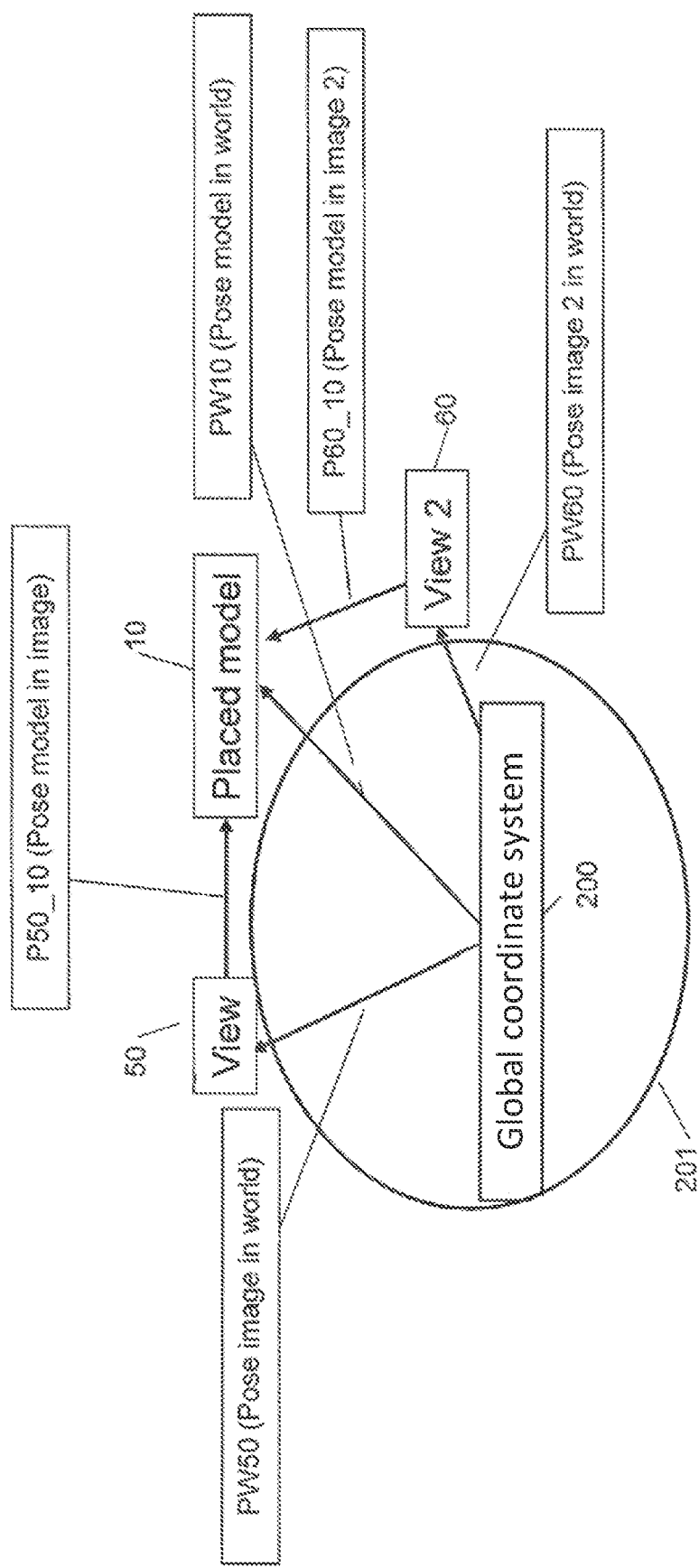
FIG. 2 shows a schematic view of an overview of participating coordinate systems according to an embodiment of the invention.

FIG. 1A shows a plan view illustrating a schematic arrangement of a first exemplary embodiment of a system setup which can be used for performing a method according to the invention.

In the illustration of FIG. 1A, the user wears, as display device, a head mounted display system ("Head Mounted Display", abbreviated to HMD) comprising a display 21 that is part of the system setup 20. At least parts of the system setup 20 may be regarded as a mobile device comprising one or more mutually connected components, as will be explained in more detail hereinafter. The components can be connected to each other by wire connections and/or in wireless manner. Furthermore, it is also possible that some of the components, such as e.g. the computer 23, are provided as stationary components, i.e. do not move along with the user. The display 21 e.g. may be generally known data glasses in the form of so-called optical see-through data glasses ("optical see-through display", in which the reality can be seen through the semi-transparent structure of the data glasses) or in the form of so-called video see-through data glasses ("video see-through display", in which the reality is represented on a screen worn in front of the head of the user), in which virtual information provided by a computer 23 can be blended in known manner. The user then sees, in a view 70 of the real world within a viewing angle or aperture angle 26, that can be seen through the display 21 or on the display 21, objects of the real environment 40 that can be augmented with blended in virtual information 10 (such as e.g. so-called point of interest objects, briefly referred to as POI objects, related to the real world). The virtual object 10 is blended such that the user perceives the same in a manner as if it were arranged in an approximate position in the real environment 40. This position of the virtual object 10 can also be stored as global position with respect to a geographic global coordinate system, such as a coordinate system of the earth, as will still be explained in more detain hereinafter. In this manner, the system setup 20 constitutes a first embodiment of a generally known augmented reality system that can be used for the method according to the present invention.

The display 21 may have additional sensors 24, such as rotation sensors, GPS sensors or ultrasonic sensors, and a camera 22 for optical tracking and for taking one or more images (so-called "views") mounted thereon. Display 21 can be semi-transparent or may be fed with images of the reality by a camera image of camera 22. With a semi-transparent display 21, calibration between eye 25 of the user and display 21 is necessary. This process, referred to as see-through calibration, is known in the art. The calibration advantageously can determine at the same time the pose of the eye in relation to the camera 22. The camera can be used for taking or recording views in order to make these accessible to other users, as will still be explained in more detail hereinafter. The pose in general is understood to be the position and orientation of an object in relation to a reference coordinate system. For determining the pose, there are various methods documented in the prior art and known to the expert. Advantageously on display 21 or anywhere on the user's body or also in computer 23, there may also be installed position sensors, such as e.g. GPS sensors (GPS: Global Positioning System) for rendering possible a geographic position determination of the system setup 20 (e.g. in accordance with longitude, latitude and altitude) in the real world 40. Pose determination of any part of the system setup is possible in principle provided that conclusions can be made on the position and viewing direction of the user.

The illustration of FIG. 1B shows another exemplary system setup 30 that can be found often e.g. in modern mobile telephones (so-called "smartphones"). A display device 31 (e.g. in the form of a display screen or display), computer 33, sensors 34 and camera 32 constitute a system unit that is accommodated e.g. in a common housing of a mobile telephone. At least parts of system setup 30 can be regarded as a mobile device comprising one or more of the components mentioned. The components can be accommodated in a common housing or can be distributed (in part) and can be connected to each other by wire connections and/or in wireless manner.

The view of the real environment 40 is provided by display 31 showing an image 50 of the real environment 40 captured by camera 32 in a viewing angle and with an aperture angle 36. For augmented reality applications, the camera image 50 can be shown on display 31 and augmented with additional virtual information 10 (such as POI objects related to the real world) that have a specific position in relation to reality, similarly as described in FIG. 1A. In this manner, the system setup 30 constitutes another embodiment of a generally known augmented reality (AR) system.

Calibration similar to that described with respect to FIG. 1A is used for determining the pose of virtual objects 10 with respect to camera 32 in order to make the same accessible to other users, as will still be described in more detail hereinafter. For pose determination, there are various methods documented in the prior art and known to the expert. Advantageously on the mobile device (especially when system setup 30 is in the form of a unit) or at any location on the body of the user or also in computer 33, there may be attached position sensors, e.g. GPS sensors 34 in order to permit geographic position determination of the system setup 30 (e.g. in accordance with longitude and latitude) in the real world 40. In certain situations, there is no camera necessary for pose determination, e.g. when the pose is determined solely by GPS and orientation sensors. Basically, the pose determination of any part of the system setup is suitable, as long as conclusions can be made on the position and viewing direction of the user.

Basically, the present invention can be used expediently for all forms of AR. For example, it is of no relevance whether the representation is implemented in the so-called optical see-through mode with semi-transparent HMD or in the video see-through mode with camera and display screen.

The invention basically can also be used in connection with stereoscopic displays, in which the video see-through approach advantageously uses two cameras each for recording one video stream per eye. In any situation, the items of virtual information can be calculated individually for each eye and can also be stored as pair on the server.

The processing of the different partial steps described hereinafter basically can be distributed to various computers via a network. Thus, a client/sever architecture or a more client-based solution is possible. Moreover, the client or the server may also comprise several computing units, such as several Central Processing units (CPUs) or specialized hardware components, such as generally known Field Programmable Gate Arrays (FPGAs), Application Specific Integrated Circuits (ASICs), Graphics Processing Units (GPUs) or Digital Signal Processors (DSPs).

For permitting AR to be realized, the pose (position and orientation) of the camera in space is necessary. This can be realized in variety of different ways. It is possible to determine the pose in the real world e.g. by using merely GPS and an orientation sensor with electronic compass (as installed e.g. in some modern mobile telephones). However, the uncertainty of the pose then is very high. Thus, it is also possible to use other methods, such as e.g. optical initialization and tracking or the combination of optical methods with GPS and orientation sensors. Wireless Local Area Network (WLAN) locating can be used as well or RFIDs (markers or chips for "radio frequency identification") or optical markers can support the locating process. As mentioned hereinbefore, a client/server-based approach is possible here as well. In particular, the client can request from the server location-specific information needed for optical tracking Such information may be e.g. reference images of the surrounding environment with pose information and depth information. An optional embodiment of the present invention in this regard renders possible in particular to improve the pose of a view on the server and to improve, on the basis of this information, the pose of the placed virtual objects in the world as well.

In addition thereto, the invention can also be installed, or carried along, in vehicles, aircraft or ships, making use of a monitor, HMD or a head-up display.

Basically, virtual objects, such as e.g. a point of interest ("POI") can be set up for a large variety of different forms of information. Examples are given hereinafter: It is possible to represent images of places using GPS information. It is possible to automatically extract information from the Internet. For example, this may be company or restaurant websites with addresses or pages giving ratings. Users can deposit texts, images or 3D objects at specific locations and make the same available to others. Information pages, such as Wikipedia, can be searched for geo-information, and the pages can be made accessible as POI. POIs can be generated automatically from the search and browsing behavior of the users of mobile devices. It is possible to show other locations of interest, such as underground transportation or bus stations, hospitals, police stations, physicians, real estate ads or fitness clubs.

Such items of information can be deposited by a user in image 50 or in view 70 (cp. FIGS. 1A and 1B) as virtual objects 10 at specific locations in the real world 40 and made accessible to others with the position corresponding to the respective location. The other users, in an accessible view or image of the real world, can then e.g. manipulate this information that is blended in accordance with its position, or can also add further virtual objects. This will be explained in more detail in the following.

FIG. 1C first of all shows data structures that are employed in accordance with an embodiment of the invention and will be explained briefly hereinafter.

A view is a captured view of the real world, in particular a view (cp. view 70 according to FIG. 1A), an image (cp. image 50 according to FIG. 1B) or an image sequence (a film or motion picture). Associated with the view (image 50/view 70) are camera parameters that describe optical properties of camera 22, 32 (e.g. with respect to aperture angle, focus displacement or image distortion) and are to be associated with image 50 or view 70, respectively. Besides, the view also has pose data associated therewith that describe the position and orientation of the image 50 or view 70 in relation to the earth. To this end, a geographic global coordinate system is associated with the earth so as to render possible geographic global location determination in the real world, e.g. in accordance with longitude and latitude.

A placed model is a virtual object that can be displayed graphically (cp. object 10 according to FIGS. 1A, 1B), which has pose data as well. The placed model can represent e.g. an instance of a model of a model database, i.e. make reference to the same. Advantageously, it is deposited by which views 50 or 70 the respective virtual model 10 was placed in world 40, if this is so. This may be used to improve the pose data, as will still be explained in more detail hereinafter. A scene constitutes a combination of a view 50, 70 with 0 to n placed models 10 and optionally contains a creation date. All or part of the data structure can be linked with meta data in addition. For example, the creator, the date, the frequency of the images/views, ratings and key words can be deposited.

In the following aspects of the invention with respect to the embodiment according to FIG. 1B will be described in more detail, in which an image 50 is taken by a camera 32 and is viewed by the viewer on display 31 together with blended in virtual objects 10. The statements in this regard, however, can easily be transferred by the expert analogously to the embodiment using HMD according to FIG. 1A as well.

FIG. 2 gives an overview of participating coordinate systems according to an embodiment of the invention. On the one hand, a global coordinate system 200 is used (which in this embodiment is represented by the geographic global coordinate system) that constitutes a connecting element. The earth's surface is indicated in FIG. 2 with numeral 201. For defining a geographic global coordinate system, such as a global coordinate system 200, various standards have been defined that are known to those skilled in the art (e.g. WGS84; NMA—National Imagery and Mapping Agency: Department of Defense World Geodetic System 1984; Technical Report, TR 8350.2, 3rd edition, January 2000). Furthermore, a camera coordinate system provides a connection between displayed virtual objects 10 and images 50. By way of conversions known to the expert, it is possible to calculate from the poses of camera 32 and image 50 in global coordinate system 200, the pose P50.sub.—10 ("pose model in the image") of an object 10 relative to image 50. The global image pose PW50 ("pose image in the world") is calculated e.g. via GPS and/or orientation sensors. From poses PW50 and P50.sub.—10, the global pose PW10 ("pose model in the world") of the virtual object 10 can then be calculated.

In analogous manner, it is possible to calculate from the pose of a second image 60 with another global pose PW60 in the global coordinate system 200 the pose P60.sub.—10 ("pose model in image 2") of the object 10 relative to image 60. The global image pose PW60 ("pose image 2 in the world") is calculated also e.g. via GPS and/or orientation sensors.

In this way it is possible to place a virtual object 10 in a first image (image 50) and to view the same in a second image (image 60) at a position on the earth located in the vicinity, but from a different viewing angle. The object 10 is placed, for example, by a first user in the first image 50 with pose PW10. When a second user with his mobile device then generates a view according to image 60, the virtual object 10 placed by the first user is automatically blended in image 60 at the same global position corresponding to pose PW10, provided that the image 60 covers in an aperture angle or viewing angle a portion of the real world which includes the global position of pose PW10.

In the following, aspects and embodiments of the invention will be explained in more detail by way of the flowcharts of FIGS. 3 and 4 in conjunction with the other figures.

Figure 3:
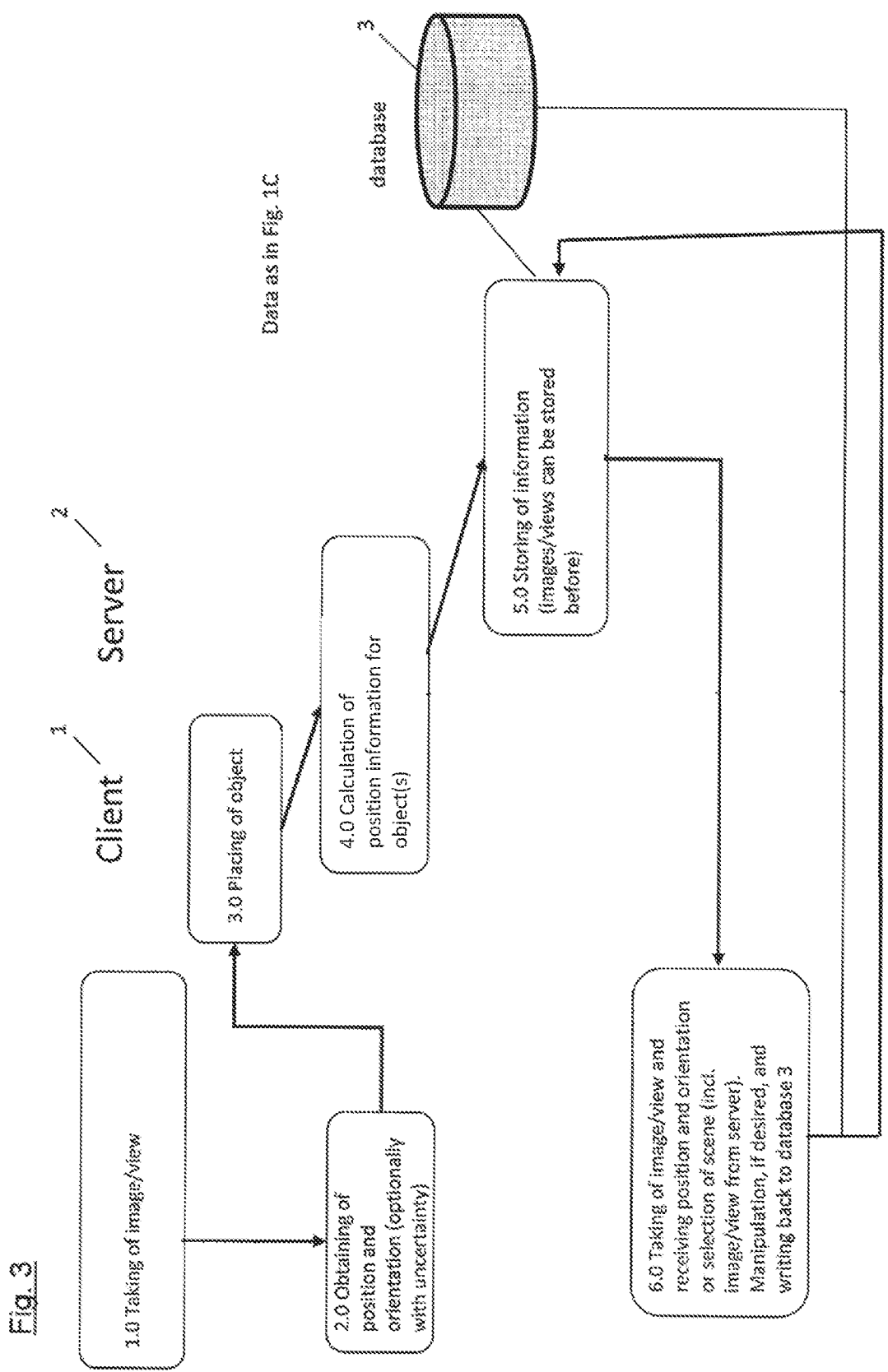
FIG. 3 shows an exemplary course of a method according to an embodiment of the invention.

FIG. 3 shows an exemplary course of a method according to an embodiment of the invention. In a first step 1.0, world-related data are generated. These can be extracted e.g. from the Internet or be generated by a first user using a camera (FIG. 1B) or a HMD with camera (FIG. 1A). To this end, the user in step 1.0 takes a view (image or captured view) with respect to which position and orientation (pose) in the world are ascertained (step 2.0). This can take place, for example, using GPS and compass. Optionally, information regarding uncertainty of the data generated can be recorded in addition.

When the view (image or captured view) is present, the user can advantageously place a virtual object in the view directly on his mobile device (step 3.0). Advantageously, the object is placed and manipulated in the camera coordinate system. In this case, there is calculated in step 4.0 from the global pose of the view and the pose of the object in the camera coordinate system, the global pose of the virtual object (or objects) in the world (e.g. in relation to global coordinate system 200). This can take place on a client 1 or on a server 2.

A client is a program on a device that establishes contact with another program on a server in order to use the services of the same. The underlying client-server model allows tasks to be distributed to different computers in a computer network. A client does not resolve one or more specific tasks itself, but has them done by the server or receives corresponding data from the server offering a service to this effect. Basically, most steps of this system can be carried out either on the server or the client. With clients with high computing capacity, it is e.g. advantageous to have them perform as many calculations as possible and to thus relieve the server.

In step 5.0, these items of information from step 4.0 are then stored in a database 3 of the server 2, advantageously as described with respect to FIG. 1C. In step 6.0, the same user or another user on another client then takes an image of the real environment on (or views a specific part of the environment by means of a HMD) and then loads data stored in step 5.0 with respect to a location of the viewed real environment from server 2. Loading and displaying the location-related information using augmented reality and a database advantageously equipped with geospatial function features is known in the art. The user now sees the previously stored information from the previously stored or a new viewing angle and is capable of effecting changes (manipulation of existing and/or adding new virtual information), which in turn are stored on server 2. Here, the user does not have to be present, but can use the previous, advantageously stored view as a window on reality, while sitting in his office, for example, at an Internet-enabled client.

In the example of FIGS. 1 and 2, a user thus provides or generates a virtual object 10 on database 3 of server 2 which has a global position and orientation with respect to a geographic global coordinate system 200, together with the pose data (pose PW10) that allow a conclusion to be made on the global position and orientation of virtual object 10. This user or another user takes at least one image 50 of a real environment 40 by means of a mobile device 30 together with the pose data (pose PW50) permitting a conclusion to be made as to at which position and with which orientation with respect to the geographic global coordinate system 200 the image 50 was taken. The image 50 is displayed on display 31 of the mobile device. Access is made to the virtual object 10 in database 3 of the server, and the virtual object 10 then is positioned in image 50 shown on the display on the basis of the pose data of poses PW10 and PW50. The virtual object 10 can then be manipulated by corresponding positioning (cp. arrow MP in FIG. 1B) in image 50 shown on the display (e.g. be displaced), or there may be another virtual object 11 added by corresponding positioning in the image 50 shown on the display.

Such a manipulated virtual object 10' together with the modified pose data (modified pose PW10) according to the positioning in image 50 or such a further virtual object 11 together with its pose data according to the positioning in image 50 is then stored in database 3 of server 2, with the modified pose data PW10 and the pose data of the new virtual object 11 each permitting a conclusion to be made on the global position and orientation of the manipulated object 10' or the further virtual object 11 with respect to the global coordinate system 200.

It may happen in certain cases that the server cannot be reached and that storing of the new scene thus is not possible. In this event, it is advantageously possible that the system reacts and provides for buffering the information until the server is available again. In one embodiment, in the event of failure of the network connection to the server, the data to be stored on the server are buffered on the mobile device and transmitted to the server when the network connection is available again.

In another embodiment, the user can retrieve a collection of scenes in an area of a real environment (e.g. in his surrounding area or local area) that are made available to him for selection in a list ordered by proximity, or on a map or using augmented reality.

In another embodiment, the image or the virtual information has uniquely identifying characteristics (such as unique names), and an image or virtual information, which is already present on a client or on the mobile device (this may be virtual model data or views), will not be downloaded any more from the server, but is loaded from a local data storage.

Figure 4:
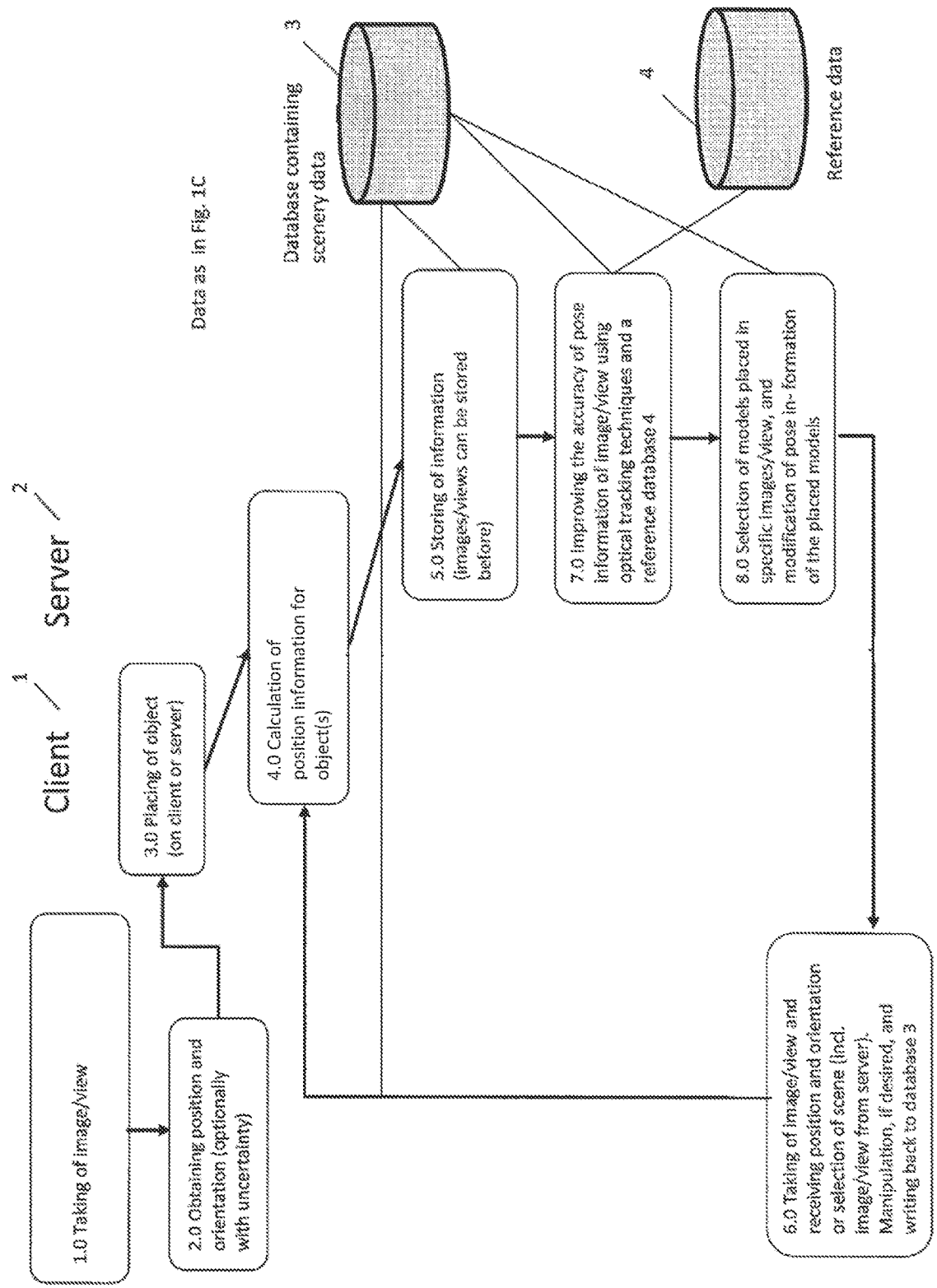
FIG. 4 shows an exemplary course of a method according to another embodiment of the invention, in particular supplemented by optional measures for improving the image pose.

FIG. 4 shows an exemplary course of a method according to another embodiment of the invention, in particular supplemented by optional measures for improving the image pose. The method comprises the steps 1.0 to 6.0 of FIG. 3. In addition, in steps 7.0 and 8.0 of FIG. 4, the pose of the view (image or captured view) is improved subsequently, for example by means of optical methods, and due to the advantageous storing of information as to which virtual information was placed by means of which view, the pose of the information is corrected as well. Alternatively, the pose of the view can be improved immediately after creating the view already on client 1 by providing optical tracking reference information for this view, or a view with a similar pose, to the client 1 from a reference database 4 of server 2. Alternatively, the accuracy of the view can also be effected before computing the pose of the virtual objects placed (step 4.0) and can be stored directly in correct manner. However, an advantage of the subsequent approach is that reference data do not already have to be available for all locations and that a correction thus can also be performed for such views as soon as reference data are available.

Of course, it is also possible to use other views are used as reference data, especially when many views are available for a location. This method, referred to as bundle adjustment, is known in the art, such as described e.g. in the publication of MANOLOS I. A., LOURAKIS and ANTONIS A. ARGYROS A: SBA: A Software Package for Generic Sparse Bundle Adjustment. In ACM Transactions on Mathematical Software, Vol. 36, No. 1, Article 2, Publication date: March 2009. In this case, the 3D position of point correspondences, the pose of the views and advantageously also the intrinsic camera parameters could be optimized. Thus, the approach according to the invention also offers the possibility to create an own model of the world in order to use such data in general. For example, for masking models to support the perception of depth or for optical tracking in real time.

Figure 5:
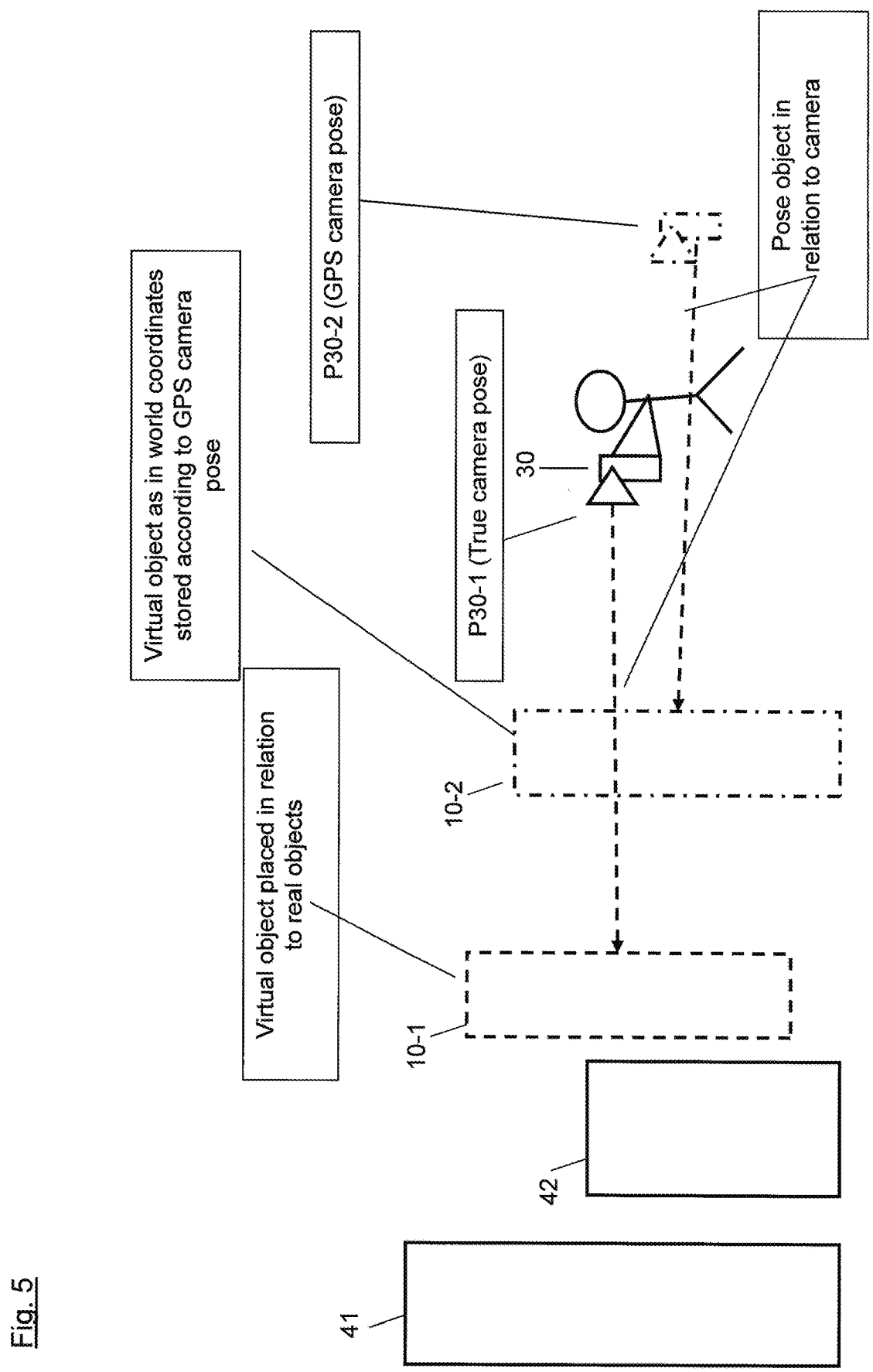
FIG. 5 shows an exemplary scene of a real environment having virtual objects placed therein, without pose improvement having been effected.

FIG. 5 shows an exemplary scene of a real environment with virtual objects placed therein it, without a pose improvement having taken place so far. FIG. 5 shows a possible situation prior to correction. A virtual object 10 (e.g. a review of a restaurant) is placed, as seen from a mobile device 30, in an image shown on display 31 of the device 30 in relation to real objects 41, 42 (representing e.g. the building of the restaurant). On the basis of incorrect or inaccurate GPS data, both the image and the object 10 are stored with incorrect world coordinates in a manner corresponding to the incorrectly or inaccurately determined camera pose data P30-2. This leads to an object 10-2 that is stored in correspondingly incorrect manner. This is no problem in this captured image as such. However, the error becomes apparent when the virtual object 10 is viewed e.g. on a map or in another image.

If the image were generated along with true or accurate camera pose data P30-1, the virtual object 10 would be displayed at a position in the image, as shown by the representation of the virtual object 10-1 and would also be viewed in this manner by the user generating the same. The incorrectly stored virtual object 10-2, however, is shown in another image as displaced from the true position of the virtual object 10, in accordance with an extent by which the erroneous camera pose P30-2 is displaced from the true camera pose P30-1. The representation of the incorrectly stored virtual object 10-2 in the image of the mobile device 30 thus does not correspond to the true positioning by the generating user in a previous image.

For improving the accuracy of the representation of virtual objects and their position in the image of the real environment, an embodiment of the method according to the invention comprises the following steps: there is provided a reference database 4 with reference views of a real environment together with pose data that permit a conclusion as to at which position and with which orientation with respect to the geographic global coordinate system 200 the respective reference view was taken by a camera. Then, at least part of a real object shown in the image is compared with at least part of a real object contained in at least one of the reference views, and matching of the pose data of the image with the pose data of the at least one reference view is effected. Thereafter, at least part of the pose data of the image is modified on the basis of at least part of the pose data of the respective reference view as a result of matching.

Moreover, in a further embodiment, at least part of the pose data of virtual object positioned in the image is modified as a result of matching of the pose data of the image with the pose data of the respective reference view.

Figure 6:
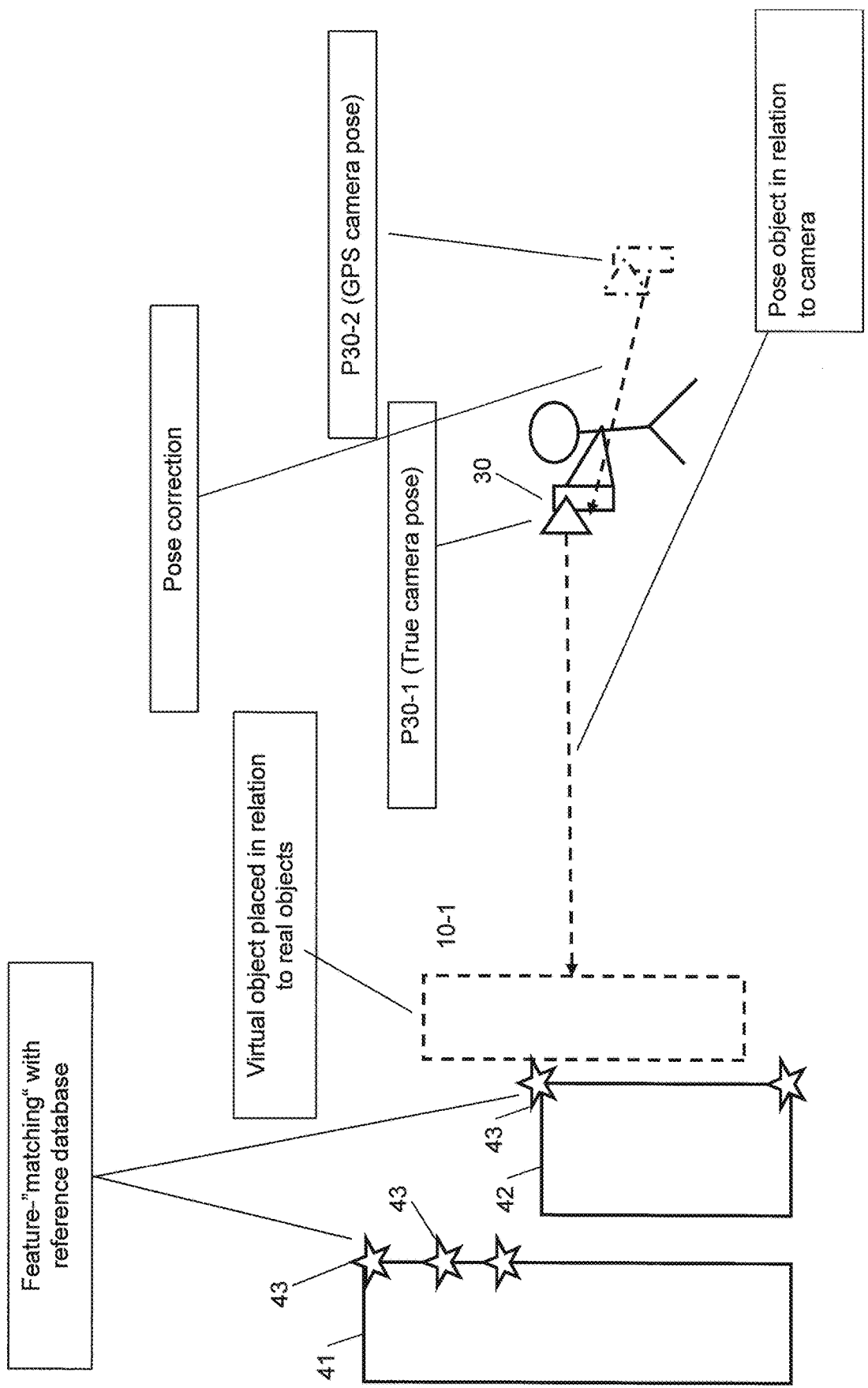
FIG. 6 shows an exemplary scene of a real environment having virtual objects placed therein, after pose improvement has been effected.

FIG. 6 shows an exemplary scene of a real environment similar to that of FIG. 5 with a virtual object 10-1 placed therein, after pose improvement has taken place. FIG. 6 shows, on the one hand, the mechanism of recognition of image features in the image and, on the other hand, the corresponding correction of image pose and object pose. In particular, image features 43 (e.g. distinctive features of real objects 41 and 42) are compared with corresponding features of reference images of a reference database 4 and matched (known as "matching" of image features).

Now, the virtual object 10 would also be represented correctly in other images (that have a correct pose), or a placement correction could be effected. The expression placement correction is to point out that the user, in placing a virtual object in perspective manner, could indeed misjudge the height of the object placed above the ground. By way of two images that may overlap in parts of the recorded reality, it may be possible to extract a ground level and to relocate the objects placed in such a way that they are on the ground, but in the image, in which they were originally placed, seem to remain almost in the same location.

Figure 7B:
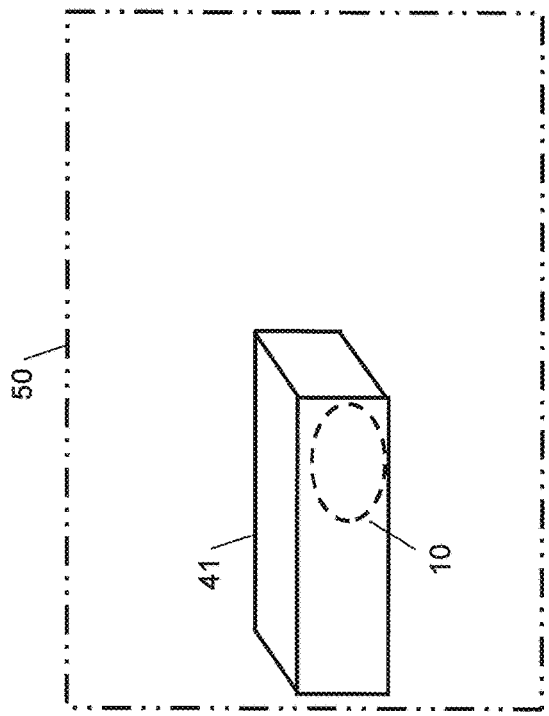
FIG. 7B shows an exemplary perspective view of the same scene as in FIG. 7A.
Figure 7A:
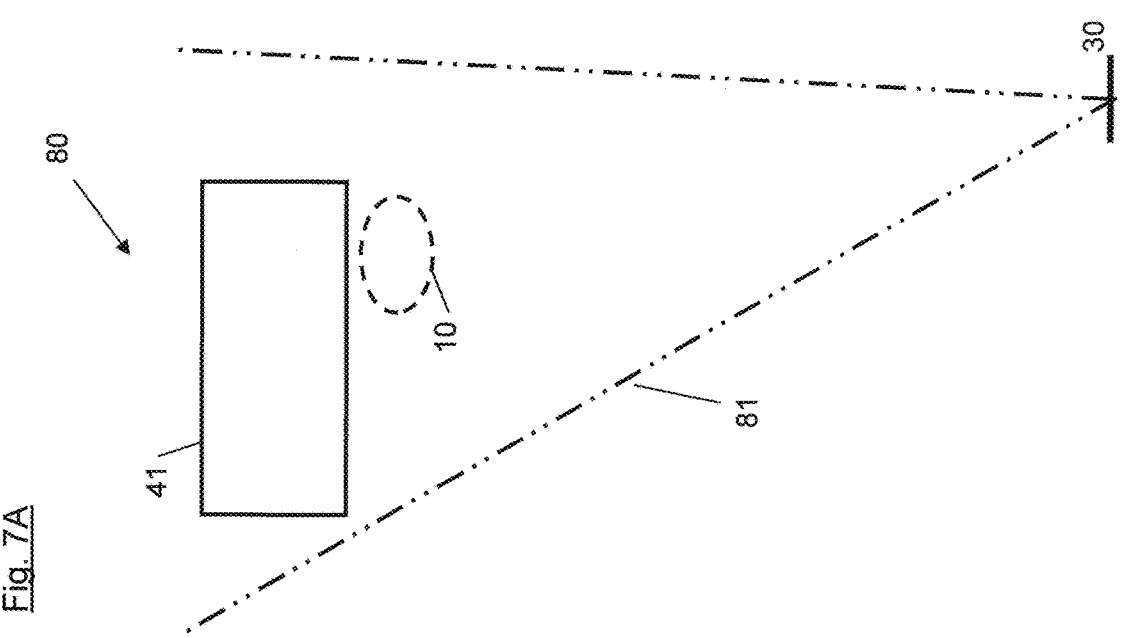
FIG. 7A shows an exemplary map view of the real world in which a virtual object has been placed.

FIG. 7A shows an exemplary map view of the real world in which a virtual object has been placed, whereas FIG. 7B shows an exemplary perspective view of the same scene as in FIG. 7A. FIGS. 7A and 7B serve to illustrate in particular the user-assisted determination of the camera pose. For example, it is useful e.g. when mobile devices are used which are not equipped with compass, to obtain a rough estimate of the viewing direction. To this end, the user, as shown in FIG. 7B, can take an image 50 in the usual manner and place a virtual object 10 in relation to a real object 41. Thereafter the user may be prompted to again show the position of a placed object 10 on a map 80 or a virtual view 80 of the world, as shown in FIG. 7A. On the basis of the connection between GPS position of the image 50 and the object position of object 10 on map 80, it is then possible to calculate or correct the orientation (heading) of the image 50 in the world. When the mobile device does not have GPS either, the process can also be performed with two virtual objects or a virtual object and the indication of the current location. Furthermore, it is also possible to indicate to the user, as exemplified in FIG. 7A, the "Field of view" (cp. indicator 81 of image section) of the last image, and for correction, the user can interactively move the "Field of view" in the map and reorient the same. Here, the aperture angle of the "Field of view" can be shown in accordance with the intrinsic camera parameters.

According to this embodiment, the method includes in particular the following steps: providing a map view (cp. map view 80) on the display of the mobile device and providing a choice for the user to select a viewing direction in taking the image. It is possible in this way to select in the map the viewing direction in which the user looks with the camera at the particular moment.

According to another embodiment of the invention, the method comprises the additional steps: placing the virtual object in the image of the real environment and in a map view provided on a display of the mobile device, and determining an orientation of the image from a determined position of the image and the position of the virtual object in the map view provided. It is thus possible that virtual objects are placed on the map and moreover in the perspective image of the real environment, which permits conclusions to be made on an orientation of the user.

In order to allow also other users to view and edit an image of a real environment that is augmented with virtual objects, from a distance (for example, on a client that communicates with the server, e.g. via the Internet), it is provided in an embodiment of the invention that the method comprises the following further steps:

There is provided at least one image of the real environment together with its pose data on the database of the server. Thereafter, access is made to the image of the real environment on the server and the image is transmitted to a client device for displaying the image on the client device. The user manipulates the virtual object or adds another virtual object by corresponding positioning in the image of the real environment shown on the client device. The manipulated virtual object, together with its modified pose data according to the positioning in the image shown on the client device, or the further virtual object together with its (new) pose data according to the positioning in the image shown on the client device, on the database of the server, with the modified pose data or new pose data each permitting a conclusion as to the global position and orientation of the manipulated or further virtual object in the image displayed on the client device. Thus, with a "remote access" on a client device, the AR scene in the image can be modified or augmented with additional virtual information and be written back to the server. Due to the newly stored global position of the manipulated or new virtual information, this position in turn can be retrieved by other users via access to the server and can be viewed in an AR scenery corresponding to the global position.

On the basis of this, the method in still another embodiment comprises the following additional steps: accessing the image of the real environment on the server and transmitting it to a second client device for viewing the image on the second client device and accessing virtual objects provided on the server, with the view of the image on the second client device displaying those virtual objects whose global position is within the real environment that is shown in the view of the image on the second client device. In this way, a viewer can observe, on another client device, a scenery in which those virtual objects are displayed that were already positioned earlier by other users at a corresponding location (i.e. the global position of which is within the real environment shown in the view of the image on that client device). In other words, the viewer sees from his viewing angle those virtual objects that were already previously placed by other users in the visible field of view.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

The invention claimed is:

1. A method comprising:
   initiating, at a first computing device, capture of a first image of an environment,
   receiving, at the first computing device, a reference image and a reference pose of the reference image, wherein the reference image and the reference pose are received from a second computing device;
   receiving, at the first computing device a first object pose of a virtual object in the reference image based on the pose of the reference image;
   calculating a second object pose of the virtual object for the first image based on the first object pose and matching one or more features of a real object depicted in the first image to corresponding features of the real object depicted in the reference image; and
   displaying the virtual object in accordance with the calculated second object pose.

2. The method of claim 1, wherein the first object pose is received from the second computing device.

3. The method of claim 2, further comprising:
   receiving input requesting relocation of the virtual object to a second location within the first image; and
   transmitting an updated object pose to the second computing device based on the second location and the matching.

4. The method of claim 1, wherein displaying the virtual object in the first image in accordance with the second object pose and the matching includes determining a pose of the first image based on the matching.

5. The method of claim 4, wherein the pose of the first image is further determined based on location data, wherein the location data includes global position system data.

6. A computer readable storage device storing instructions executable by one or more processors to:
   initiate, at a first computing device, capture of a first image of an environment,
   receive, at the first computing device, a reference image and a reference pose of the reference image, wherein the reference image and the reference pose are received from a second computing device;
   receive, at the first computing device a first object pose of a virtual object in the reference image based on the pose of the reference image;
   calculate a second object pose of the virtual object for the first image based on the first object pose and matching one or more features of a real object depicted in the first image to corresponding features of the real object depicted in the reference image; and
   display the virtual object in accordance with the calculated second object pose.

7. The computer readable storage device of claim 6, wherein the first object pose is received from the second computing device.

8. The computer readable storage device of claim 7, wherein the instructions are further executable by the one or more processors to:
   receive input requesting relocation of the virtual object to a second location within the first image; and
   transmit an updated object pose to the second computing device based on the second location and the matching.

9. The computer readable storage device of claim 6, wherein displaying the virtual object in the first image in accordance with the second object pose and the matching includes determining a pose of the first image based on the matching.

10. The computer readable storage device of claim 9, wherein the pose of the first image is further determined based on location data, wherein the location data includes global position system data.

11. A device comprising:
    an image sensor;
    one or more processors; and
    a memory storing instructions executable by the one or more processors to:
      initiate, at a first computing device, capture of a first image of an environment;
      receive, at the first computing device, a reference image and a reference pose of the reference image, wherein the reference image and the reference pose are received from a second computing device;
      receive, at the first computing device a first object pose of a virtual object in the reference image based on the pose of the reference image;
      calculate a second object pose of the virtual object for the first image based on the first object pose and matching one or more features of a real object depicted in the first image to corresponding features of the real object depicted in the reference image; and
      display the virtual object in accordance with the calculated second object pose.

12. The device of claim 11, wherein the first object pose is received from the second computing device.

13. The device of claim 12, wherein the instructions are further executable by the one or more processors to:
    receive input requesting relocation of the virtual object to a second location within the first image; and
    transmit an updated object pose to the second computing device based on the second location and the matching.

* * * * *